(12) United States Patent
Tsai

(10) Patent No.: US 6,406,042 B1
(45) Date of Patent: Jun. 18, 2002

(54) KICK SCOOTER

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 0 days.

(21) Appl. No.: 09/685,101

(22) Filed: Oct. 11, 2000

(51) Int. Cl.$^7$ .............................................. B62M 1/00
(52) U.S. Cl. .............................. 280/87.041; 280/284
(58) Field of Search ........................... 280/87.01, 87.03, 280/65, 284, 87.041, 283; 180/227

(56) References Cited

U.S. PATENT DOCUMENTS

| | | | | |
|---|---|---|---|---|
| 3,282,606 A | * | 11/1966 | Casner | 280/239 |
| 4,653,604 A | * | 3/1987 | Cortanze | 180/227 |
| 5,226,674 A | * | 7/1993 | Buell et al. | 280/284 |
| 5,295,702 A | * | 3/1994 | Buell | 280/284 |
| 5,435,584 A | * | 7/1995 | Buell | 280/284 |
| 5,487,443 A | * | 1/1996 | Thurm | 180/227 |
| 5,816,357 A | * | 10/1998 | Camlin | 180/227 |
| 6,042,138 A | * | 3/2000 | Shreck | 280/492 |

FOREIGN PATENT DOCUMENTS

| | | | |
|---|---|---|---|
| JP | 409254858 | * | 9/1997 |

* cited by examiner

*Primary Examiner*—J. J. Swann
*Assistant Examiner*—Christopher D Bottorff
(74) *Attorney, Agent, or Firm*—Browdy and Neimark, P.L.L.C.

(57) ABSTRACT

A kick scooter includes a footplate, a handle unit pivoted to a front side of the footplate and holding a front wheel, a rear wheel, and a shock absorbing mechanism coupled between a rear side of the footplate and the rear wheel, wherein the shock absorbing mechanism includes a rear fork pivoted to the footplate and adapted to hold the rear wheel, a stop plate fixedly provided at the bottom side of the footplate, a springy member disposed at the front side of the stop plate, a threaded pull bar pivoted to the rear fork and inserted through a through hole on the stop plate and a center axial hole of the springy member, and a lock nut threaded onto the threaded pull bar and stopped at one side of the springy member against the stop plate for enabling the springy member to absorb shocks when the rear wheel is moved over an uneven road surface to vibrate the rear fork.

9 Claims, 11 Drawing Sheets

KICK SCOOTER

BACKGROUND OF THE INVENTION

The present invention relates to kick scooters and, more specifically, to a shock absorbing mechanism for kick scooter, which is adjustable.

A regular kick scooter 1 with shock absorber means, as shown in FIG. 1, comprises a bottom tube 3, a rear fork 2 pivoted to the bottom tube 3 and holding a rear wheel, a seat tube 5 holding a seat (not shown), and a shock absorber 4 connected between the seat tube 5 and the rear fork 2. This structure of kick scooter is complicated and expensive. Nowadays, most popularly accepted kick scooters have a simple structure and are less heavy. These kick scooters eliminate the arrangement of a seat. Because no seat tube is provided, the aforesaid shock absorber 4 cannot be used.

SUMMARY OF THE INVENTION

It is one object of the present invention to provide a kick scooter, which has a simple structure of shock absorbing mechanism that effectively absorbs shocks during movement of the kick scooter. It is another object of the present invention to provide a shock absorbing mechanism for kick scooter, which is adjustable. According to one aspect of the present invention, the kick scooter comprises a footplate, the footplate having a front side and a rear side; a handle unit pivotally coupled to the front side of the footplate; a front wheel mounted on the handle unit at a bottom side; a rear wheel; and a shock absorbing mechanism coupled between the rear side of the footplate and the rear wheel. According to another embodiment of the present invention, the shock absorbing mechanism comprises a rear fork pivoted to the rear side of the footplate and adapted to hold the rear wheel; a stop plate fixedly connected to the footplate at a bottom side, the stop plate having a center through hole; a springy member disposed at a front side of the stop plate, the springy member having a center axle hole; a pull bar, the pull bar having a front end pivoted to the rear fork and a rear end inserted through the center through hole of the stop plate and the center axle hole of the springy member; and a lock nut threaded onto the rear end of the pull bar and stopped at one side of the springy member against the stop plate. When the rear wheel is moved over an uneven road surface, the rear fork is alternatively turned up and down relative to the footplate, the push bar is alternatively moved forwards and backwards by the rear fork, and the springy member is alternatively compressed and released to eliminate shocks.

DETAILED DESCRIPTION OF THE PREFERRED EMBODIMENT

Figure 2:
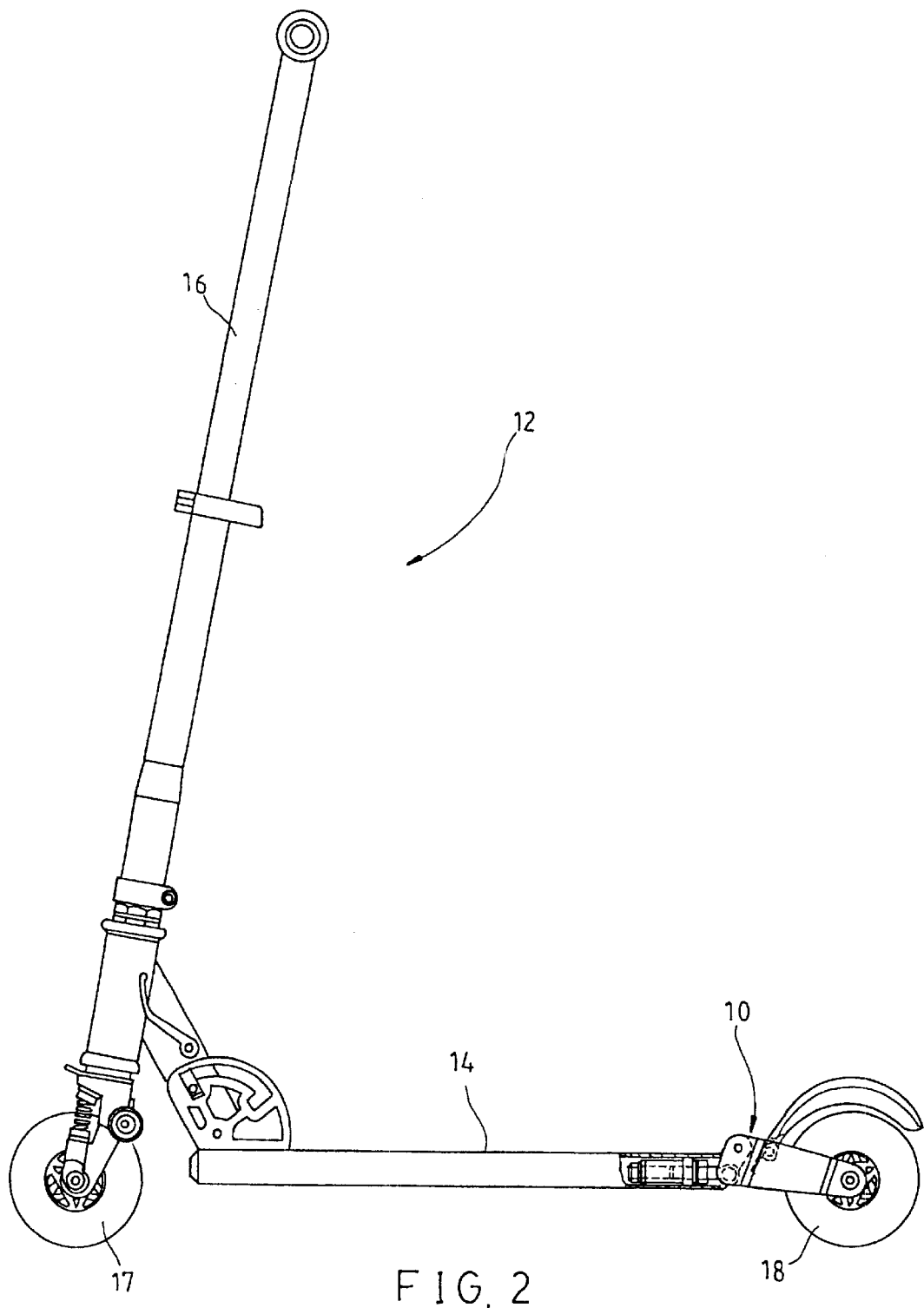
FIG. 2 is a side plain view of a kick scooter constructed according to a first embodiment of the present invention.

Referring to FIG. 2, a kick scooter 12 is shown constructed according to a first embodiment of the present invention. The kick scooter 12 comprises a footplate 14, a handle unit 16 pivotally coupled to the front side of the footplate 14, a front wheel 17 mounted on the bottom end of the handle unit 16, a rear wheel 18, and a shock absorbing mechanism 10 coupled between the rear side of the footplate 14 and the rear wheel 18.

Figure 1:
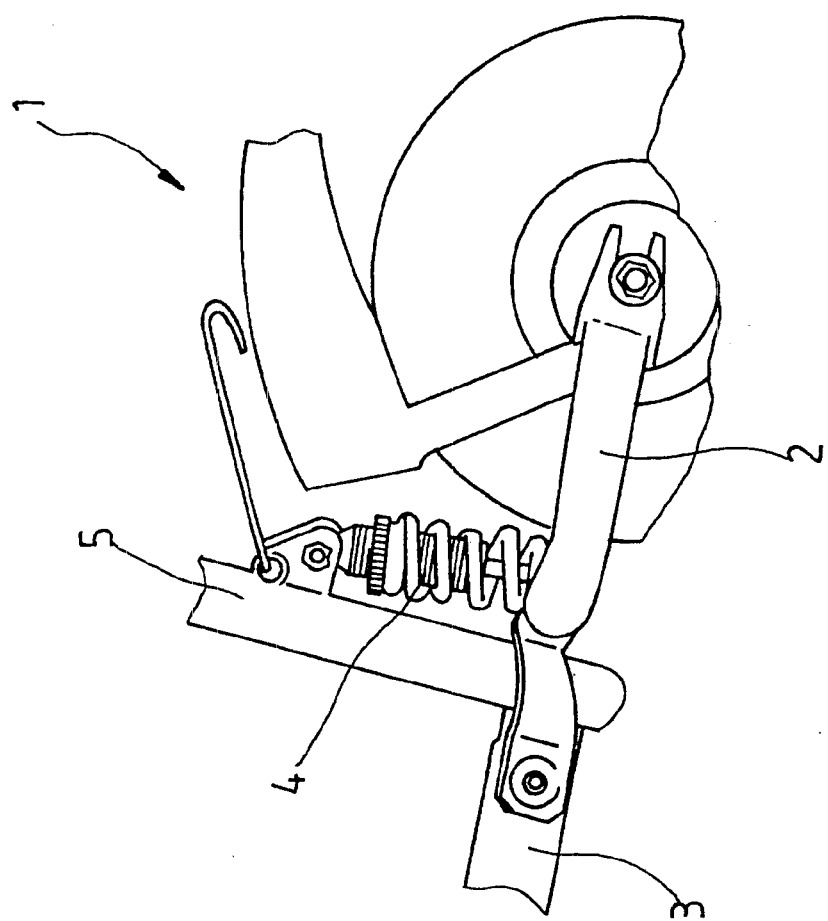
FIG. 1 illustrates the arrangement of a shock absorbing mechanism in a kick scooter according to the prior art.
Figure 3:
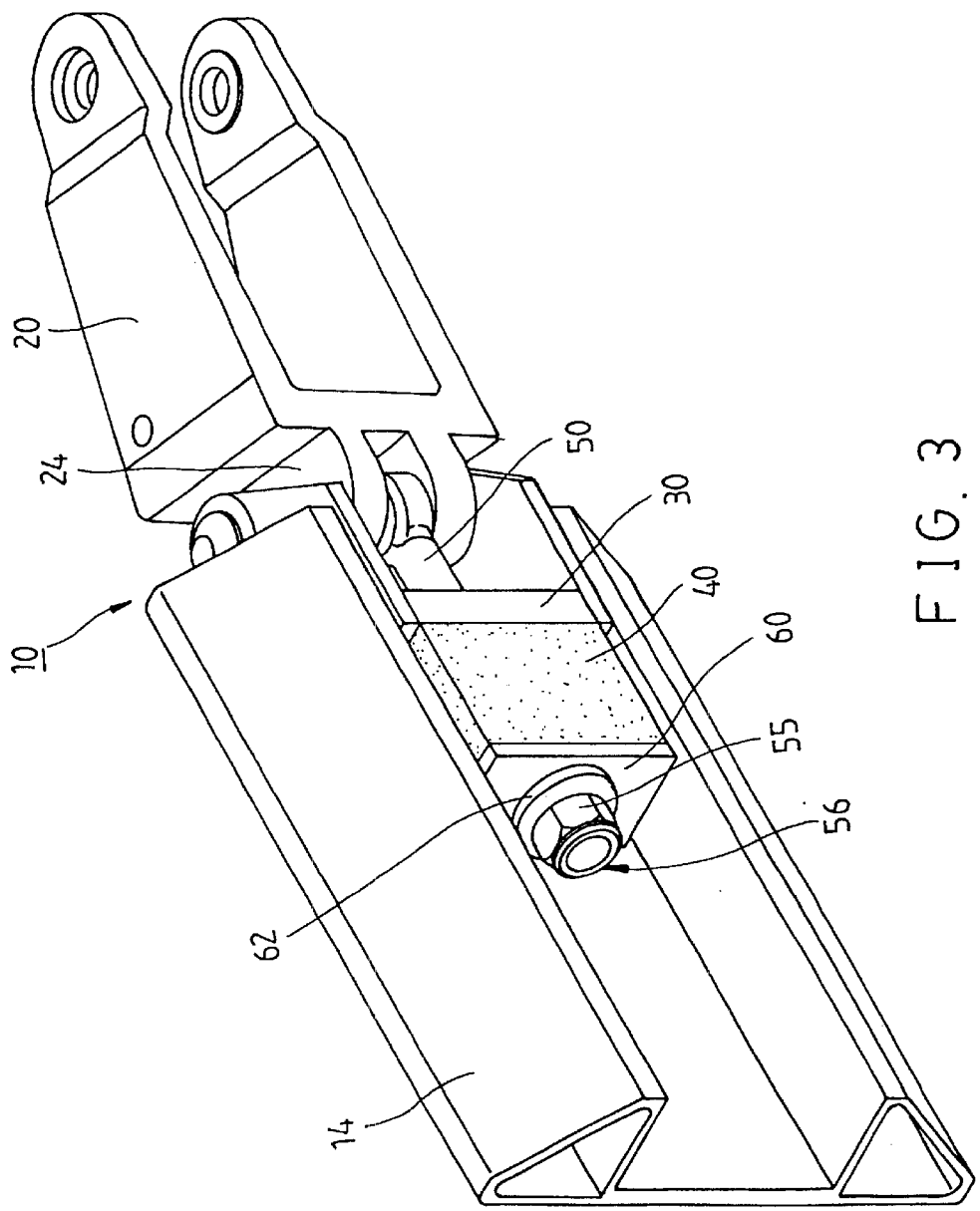
FIG. 3 is a perspective view in an enlarged scale of a part of the first embodiment of the present invention, showing the arrangement of the shock absorbing mechanism.
Figure 4:
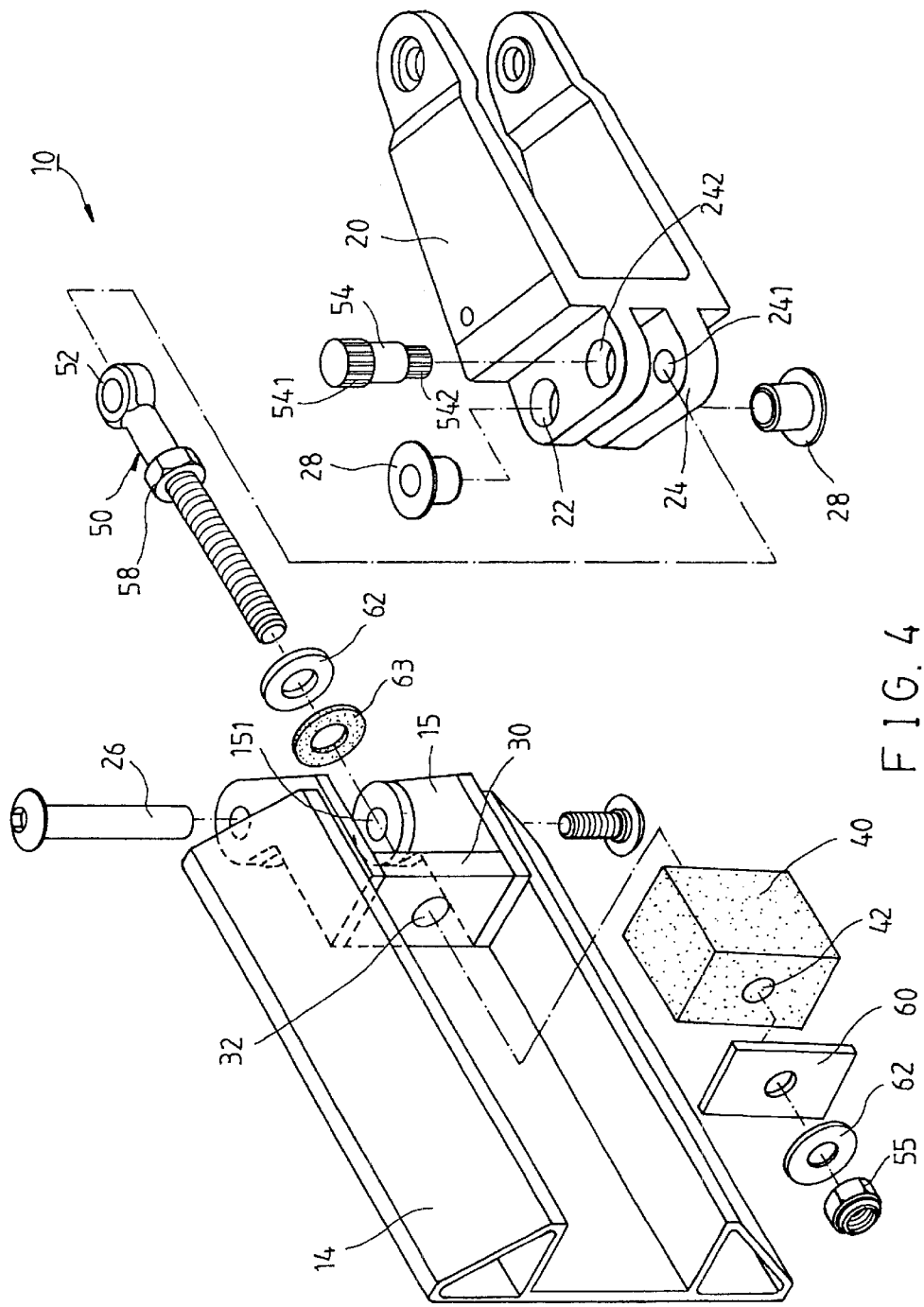
FIG. 4 is an exploded view of FIG. 3.

Referring to FIGS. 3 and 4 and FIG. 1 again, the shock absorbing mechanism 10 is comprised of a rear fork 20, a stop plate 30, a springy member 40, and a pull bar 50. The rear fork 20 is adapted to hold the rear wheel 18, comprising two parallel front lugs 24 protruded from the front sidewall thereof. The front lugs 24 each have a pivot hole 22. A small through hole 241 and a big through hole 242 are respectively made through the lugs 24. The footplate 14 comprises parallel rear lugs 15 extended backwards and then upwards, each rear lug 15 having a pivot hole 151 corresponding to the pivot hole 22 on each front lug 24 of the rear fork 20. A pivot 26 is mounted in the pivot hole 151 on each rear lug 15 of the footplate 14 and the pivot hole 22 on each front lug 24 of the rear fork 20 to pivotally secure the rear fork 20 to the footplate 14. Further, two axle bushes 28 are respectively sleeved onto the pivot 26 and mounted in the pivot hole 22 of each front lug 24 of the rear fork 20 to reduce friction between the pivot 26 and the rear fork 20. The stop plate 30 is a rectangular plate downwardly extended from the footplate 14 near its rear side, having a center through hole 32. The springy member 40 can be an elastic block molded from rubber or polyurethane. Alternatively, the springy member 40 can be a metal spring. According to the present preferred embodiment, the springy member 40 is an elastic rubber block having a center axial hole 42. The pull bar 50 is a threaded bar inserted through the center through hole 32 of the stop plate 30 and the center axial hole 42 of the springy member 40 eyelet 52, having a front end terminating in an eyelet 52, which is pivotally coupled between the front lugs 24 of the rear fork 20 by a stepped pivot bolt 54, and a rear end screwed up with a lock nut 55. The stepped pivot bolt 54 is inserted through the eyelet 52 of the pull bar 50, having a head 541 press-fitted into the big through hole 242 on one front lug 24 of the rear fork 20 and a tip 542 press-fitted into the small through hole 241 on the other front lug 24 of the rear fork 20. An adjustment nut 58 is threaded onto the pull bar 50 and stopped at one side of the stop plate 30 opposite to the springy member 40 and the lock nut 55. A pressure plate 50 is mounted around the pull bar 50 and stopped between the lock nut 55 and the springy member 40. Two washers 62 are mounted on the pull bar 50 and respectively stopped against the lock nut 55 and the adjustment nut 58 at two opposite sides of the stop plate 30. An elastic buffer member, for example, a rubber ring 63 is mounted on the pull bar 50 and stopped between the stop plate 30 and one washer 62. The adjustment nut 58 is adapted for adjusting the angle between the rear fork 20 and the footplate 14.

Figure 5:
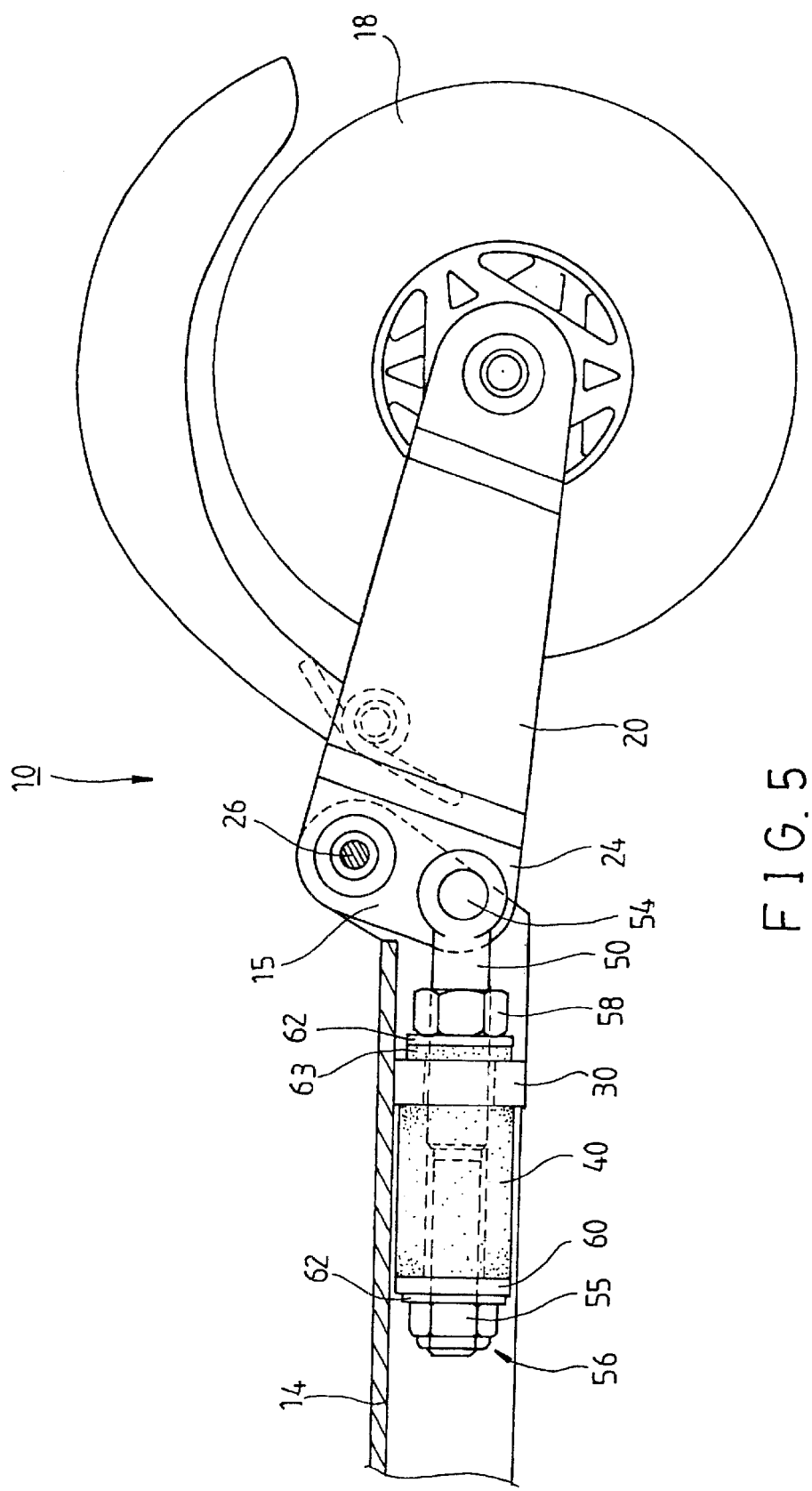
FIG. 5 is a schematic drawing showing the shock absorbing mechanism of the first embodiment of the present invention in action (Step I).
Figure 6:
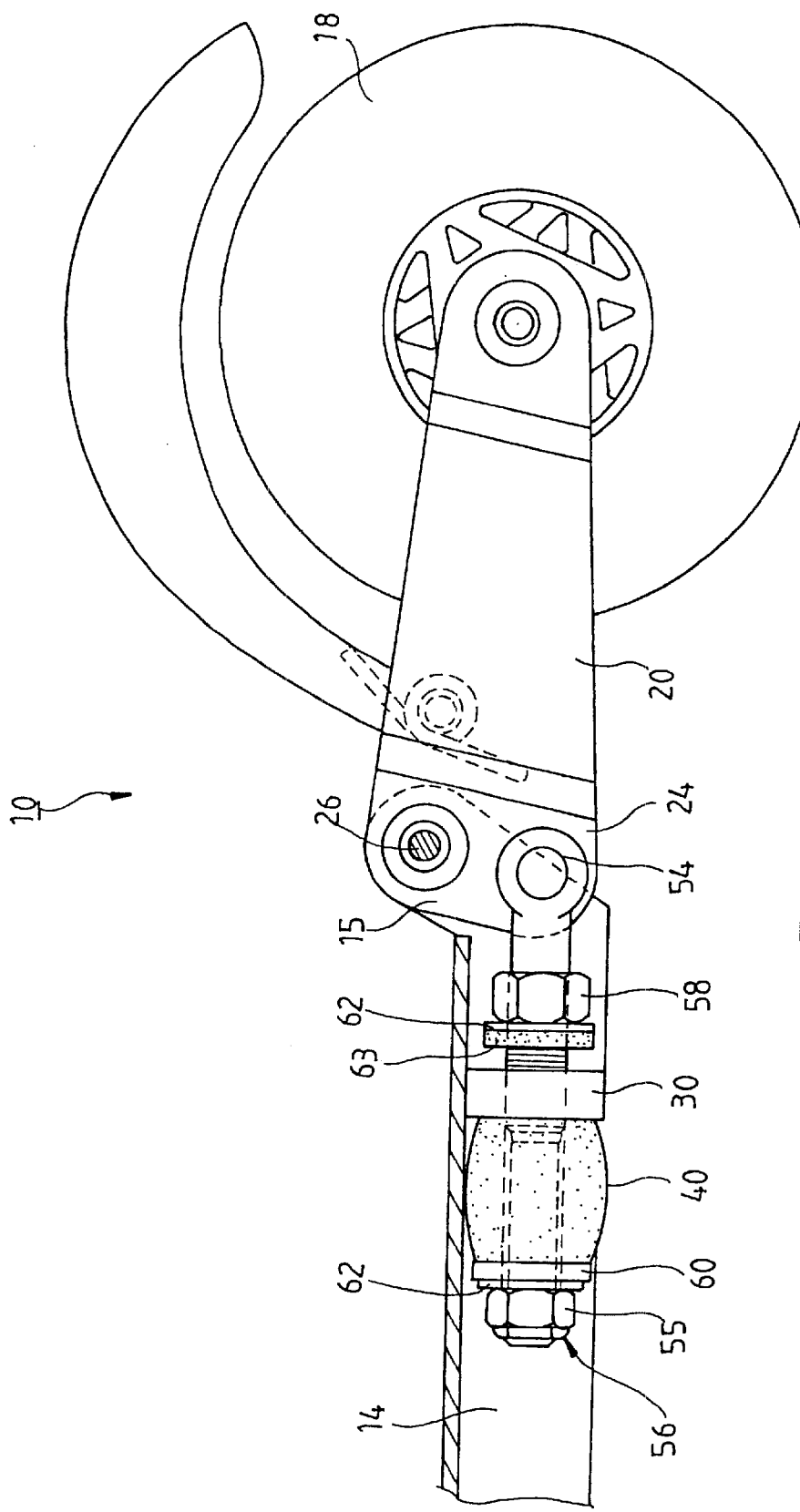
FIG. 6 is a schematic drawing showing the shock absorbing mechanism of the first embodiment of the present invention in action (Step II).

Referring to FIGS. 5 and 6, when the rear wheel 18 is moved over an uneven road surface, the rear fork 20 is forced to turn about the pivot 26 counter-clockwise and to pull the pull bar 50 backwards, causing the lock nut 55 to impart a pressure to the springy member 40 through the pressure plate 60 against the stop plate 30, and therefore the springy member 40 is compressed to absorb shocks. Further, the position of the adjustment nut 58 on the pull bar 50 controls the downward turning angle of the rear fork 18 relative to the footplate 14, i.e., the position of the adjustment nut 58 controls the angle between the rear fork 18 and the footplate 14. Therefore, the shock absorbing strength of the shock absorbing mechanism 10 is relatively adjusted when turning the adjustment nut 58 forwards or backwards on the pull bar 50.

Figure 7:
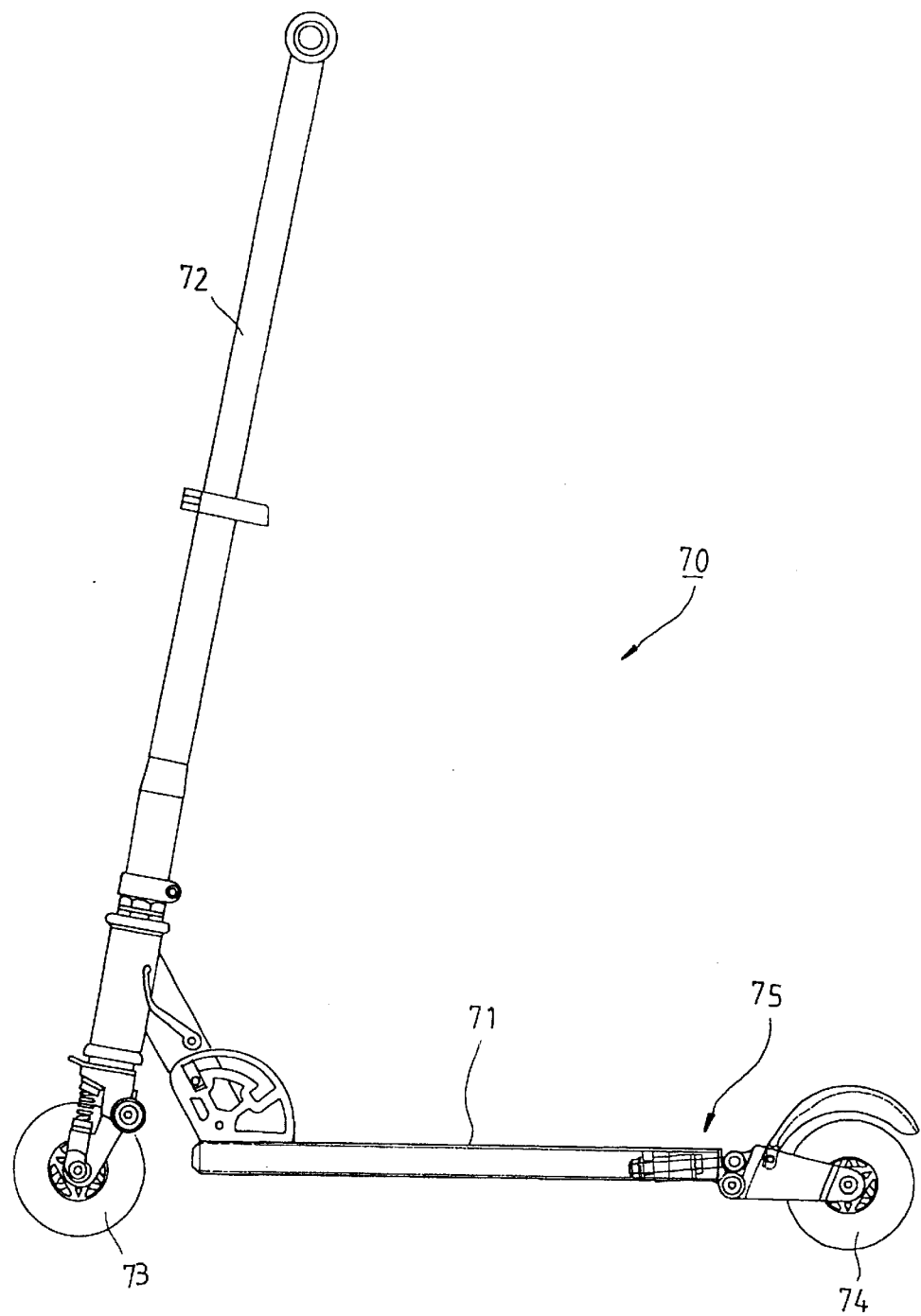
FIG. 7 is a side plain view of a kick scooter constructed according to a second embodiment of the present invention.

FIG. 7 shows a kick scooter 70 constructed according to a second embodiment of the present invention. The kick scooter 70 is comprised of a footplate 71, a handle unit 72 pivotally coupled to the front side of the footplate 71, a front wheel 73 mounted on the bottom end of the handle unit 72, a rear wheel 74, and a shock absorbing mechanism 75 coupled between the rear side of the footplate 71 and the rear wheel 74.

Figure 8:
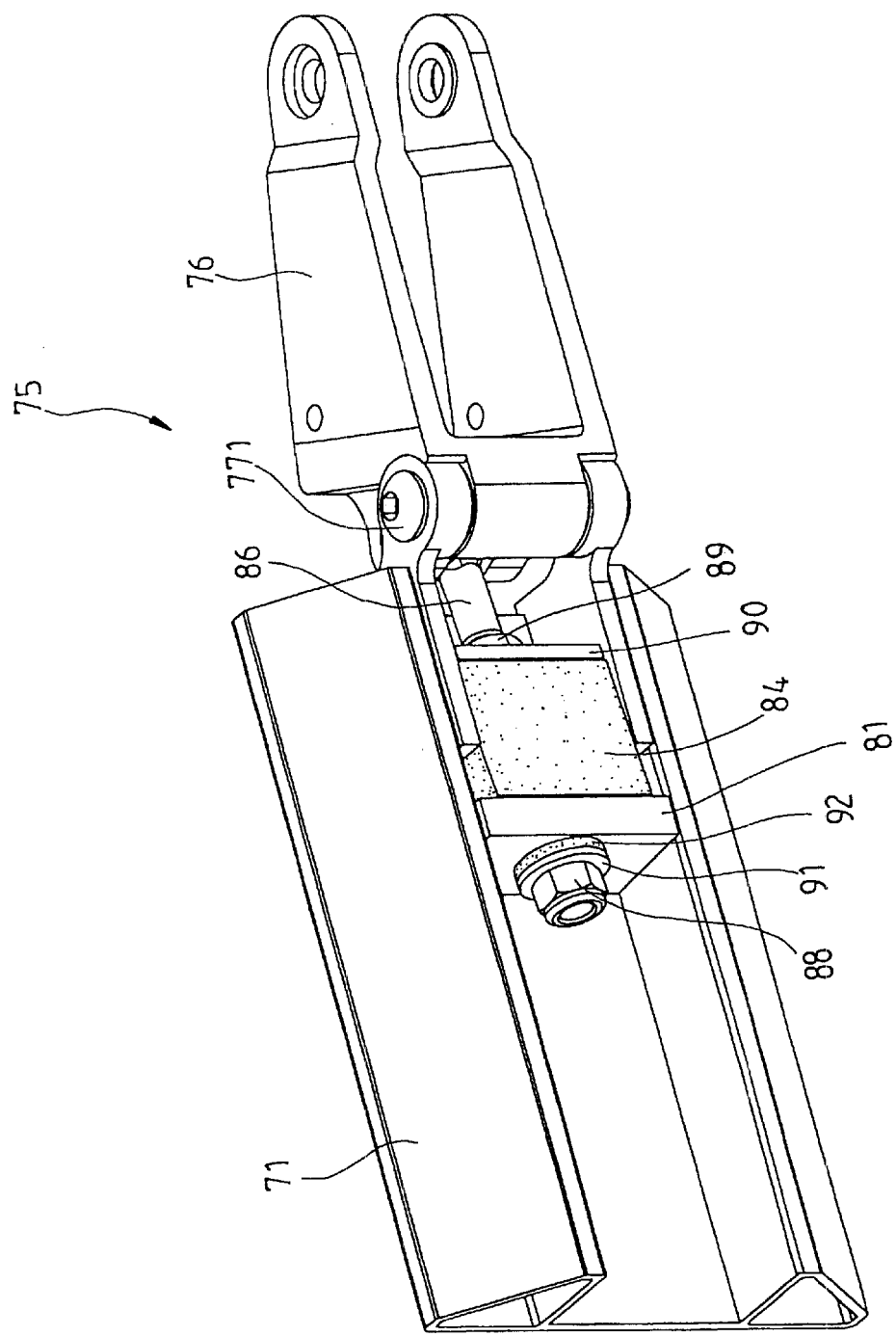
FIG. 8 is a perspective view in an enlarged scale of a part of the second embodiment of the present invention, showing the arrangement of the shock absorbing mechanism.
Figure 9:
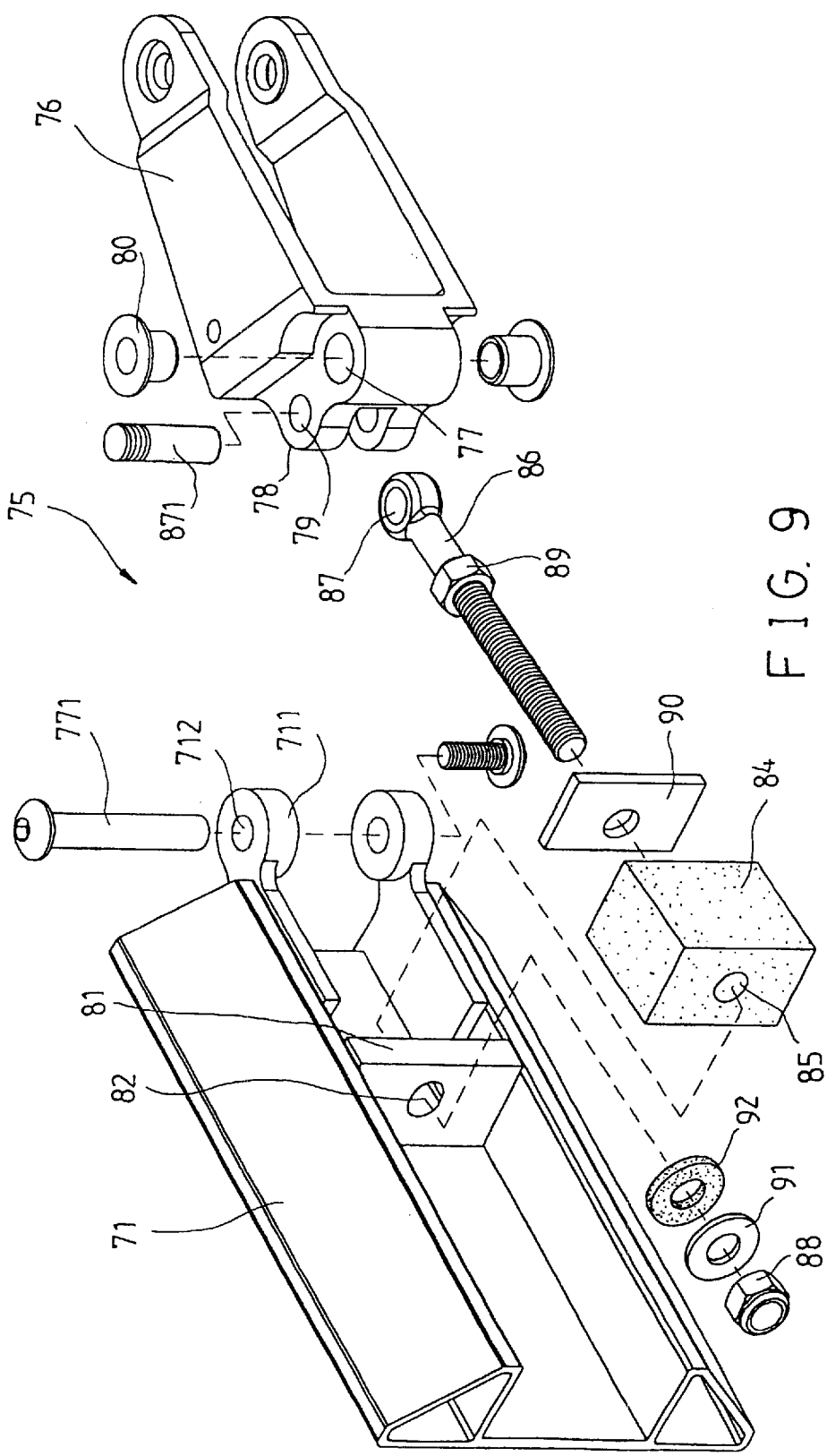
FIG. 9 is an exploded view of FIG. 8.

Referring to FIGS. 8 and 9 and FIG. 7 the shock absorbing mechanism 75 is comprised of a rear fork 76, a stop plate 81, a springy member 84, and a push bar 86. The rear fork 76 is adapted to hold the rear wheel 74, comprising a transverse barrel 77 integral with the front sidewall thereof, and two parallel front lugs 78 integral with the front sidewall and the periphery of the transverse barrel 77. The front lugs 78 each have a through hole 79. The footplate 71 comprises two parallel rear lugs 711 extended backwards and then downwards from the rear side thereof, each rear lug 711 having a pivot hole 712 corresponding to the through hole 79 on each front lug 78 of the rear fork 76. A pivot 771 is mounted in the pivot hole 712 on each rear lug 711 of the footplate 71 and the barrel 71 of the rear fork. 76 to pivotally secure the rear fork 76 to the footplate 71. Further, two axle bushes 80 are respectively sleeved onto the pivot 771 and mounted in two distal ends of the barrel 77 of the rear fork 76 to reduce friction between the pivot 771 and the rear fork 76. The stop plate 81 is a rectangular plate downwardly extended from the footplate 71 near its rear side, having a center through hole 82. The springy member 84 is disposed at the rear side of the stop plate 81, having a center axle hole 85. The push bar 86 is a threaded bar inserted through the center axle hole 85 of the springy member 84 and the center through hole 82 of the stop plate 81, having a front end terminating in an eyelet 87, which is pivotally coupled between the front lugs 78 of the rear fork 76 by a pivot bolt 871, and a rear end screwed up with an adjustment nut 88. The pivot bolt 871 is inserted through the eyelet 87 of the push bar 86, and fastened to the through hole 79 of each front lug 78 of the rear fork 76. A locating nut 89 is threaded onto the push bar 86 and stopped at the springy member 84 against the stop plate 81. A pressure plate 90 is mounted around the push bar 86 and stopped between the locating nut 89 and the springy member 84. A washer 91 is mounted on the push bar 86 and stopped between the adjustment nut 88 and the stop plate 81. An elastic buffer member, for example, a rubber ring 92 is mounted on the push bar 86 and stopped between the stop plate 81 and the washer 91.

Figure 10:
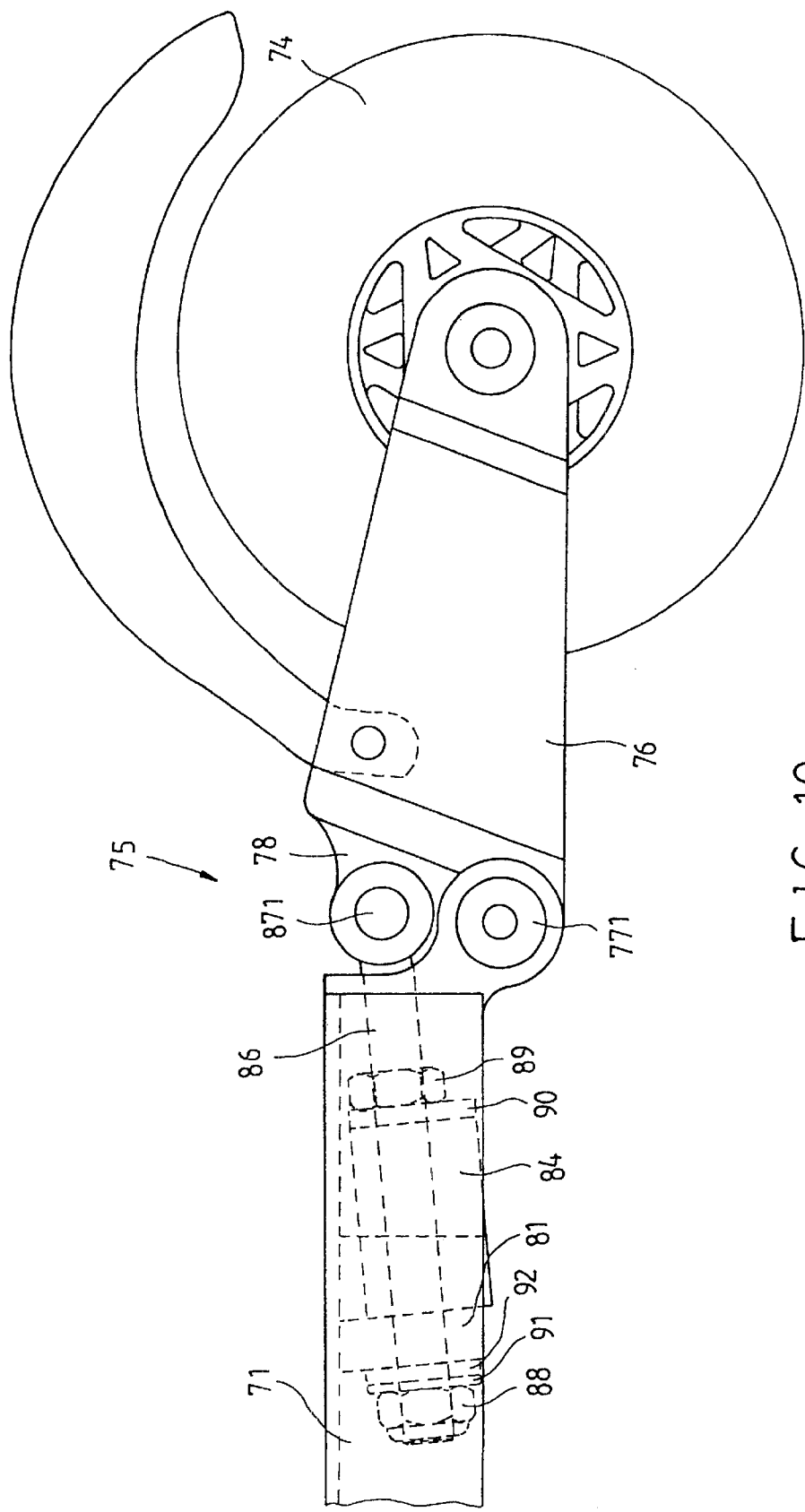
FIG. 10 is a schematic drawing showing the shock absorbing mechanism of the second embodiment of the present invention in action (Step I).
Figure 11:
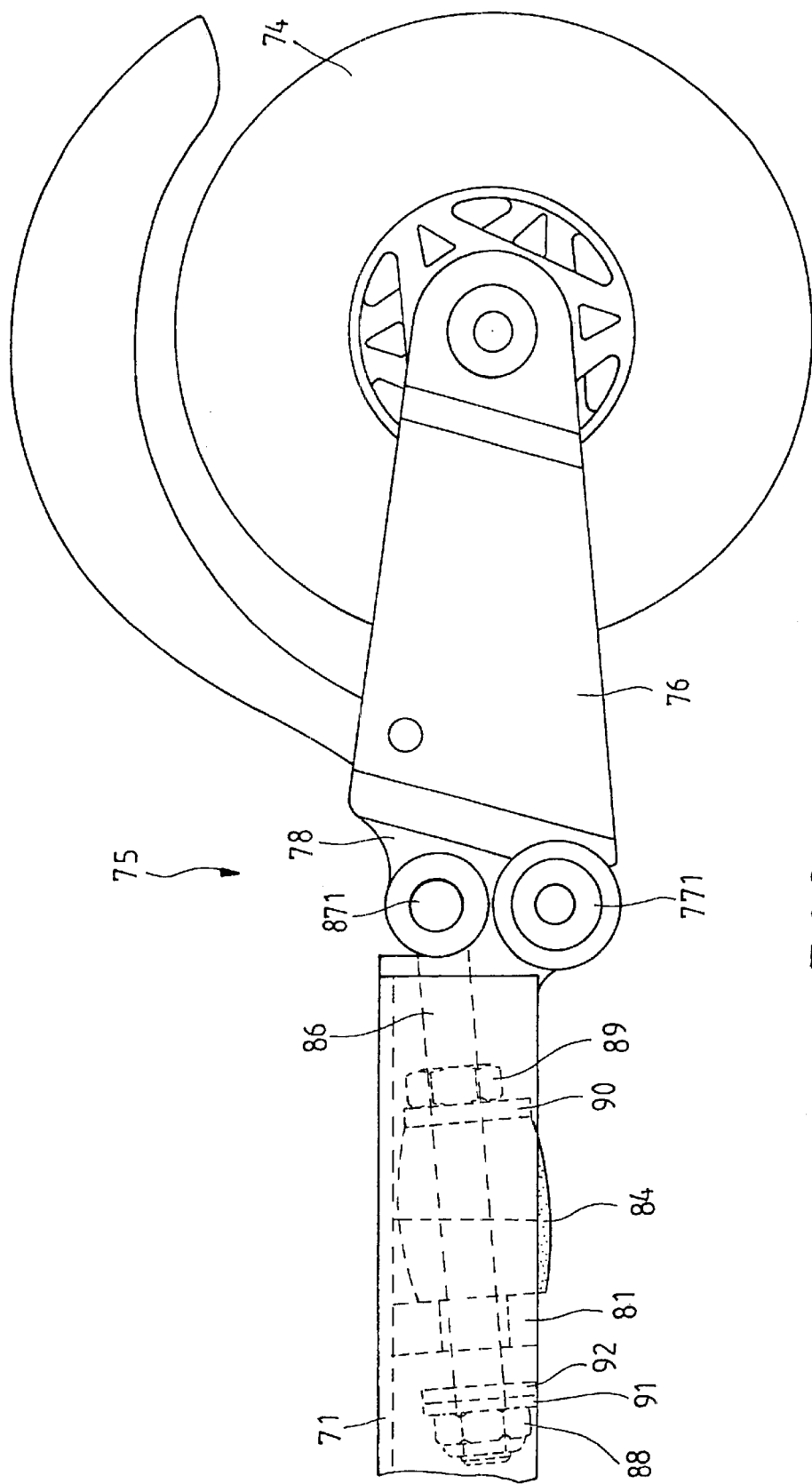
FIG. 11 is a schematic drawing showing the shock absorbing mechanism of the second embodiment of the present invention in action (Step II).

Referring to FIGS. 10 and 11, when the rear wheel 74 is moved over an uneven road surface, the rear fork 76 is forced to turn about the pivot 771 counter-clockwise and to push the push bar 50 forwards, causing the locating nut 89 to impart a pressure to the springy member 84 through the pressure plate 90 against the stop plate 81, and therefore the springy member 84 is compressed to absorb shocks. Further, the position of the adjustment nut 88 on the push bar 86 controls the angle between the rear fork 76 and the footplate 71. Therefore, the shock absorbing strength of the shock absorbing mechanism 75 is relatively adjusted when turning the adjustment nut 88 forwards or backwards on the push bar 86.

What the invention claimed is:

1. A kick scooter comprising:
   a footplate, said footplate having a front side and a rear side;
   a handle unit pivotally coupled to the front side of said footplate;
   a front wheel mounted on said handle unit at a bottom side;
   a rear wheel; and
   a shock absorbing mechanism coupled between the rear side of said footplate and said rear wheel,
   wherein said shock absorbing mechanism comprises:
      a rear fork pivoted to the rear side of said footplate and adapted to hold said rear wheel;
      a stop plate fixedly connected to said footplate at a bottom side, said stop plate having a center hole;
      a springy member disposed at a front side of said stop plate, said springy member having a center axial hole;
      a pull bar, said pull bar having a front end pivoted to said rear fork and a rear end inserted through the center through hole of said stop plate and the center axial hole of said springy member;
      a lock nut threaded onto the rear end of said pull bar and stopped at one side of said springy member against said pressure plate; and
      an adjustable nut threaded onto said pull bar and stopped at a rear side of said stop plate opposite to said springy member.

2. The kick scooter of claim 1 wherein said footplate comprises two parallel rear lugs extended from the rear side thereof, the rear lugs of said footplate each having a pivot hole; said rear fork comprises at least one pivot hole respectively pivoted to the pivot hole on each rear lug of said footplate by a pivot.

3. The kick scooter of claim 1 wherein said springy member is a urethane block.

4. The kick scooter of claim 1 wherein said springy member is a metal spring.

5. The kick scooter of claim 1 wherein said springy member is a rubber block.

6. The kick scooter of claim 1 wherein said shock absorbing mechanism further comprises a pressure plate mounted on said pull bar and stopped between said lock nut and said springy member.

7. The kick scooter of claim 1 wherein the front end of said pull bar is an eyelet pivoted to at least one pivot hole on said rear fork by pivot means.

8. The kick scooter of claim 7 wherein said rear fork comprises a big through hole and a small through hole respectively connected to the eyelet of said pull bar at two sides by said pivot means, and said pivot means is a stepped bolt inserted through the eyelet of said pull bar, having a head press-fitted into the big through hole of said rear fork and a tip press-fitted into the small through hole of said rear fork.

9. A kick scooter comprising:
   a footplate, said footplate having a front side and a rear side;
   a handle unit pivotally coupled to the front side of said footplate;
   a front wheel mounted on said handle unit at a bottom side;
   a rear wheel; and
   a shock absorbing mechanism coupled between the rear side of said footplate and said rear wheel,
   wherein said shock absorbing mechanism comprises:
      a rear fork pivoted to the rear side of said footplate and adapted to hold said rear wheel;
      a stop plate fixedly connected to said footplate at a bottom side, said stop plate having a center hole;
      a springy member disposed at a front side of said stop plate, said springy member having a center axial hole;
      a pull bar, said pull bar having a front end pivoted to said rear fork and a rear end inserted through the center through hole of said stop plate and the center axial hole of said springy member;
      a lock nut threaded onto the rear end of said pull bar and stopped at one side of said springy member against said pressure plate;
   wherein the front end of said pull bar is an eyelet pivoted to at least one pivot hole on said rear fork by pivot means; and
   wherein said rear fork comprises a big through hole and a small through hole respectively connected to the eyelet of said pull bar at two sides by said pivot mans, and said pivot means is a stepped bolt inserted through the eyelet of said pull bar, having a head press-fitted into the big through hole of said rear fork and a tip press-fitted into the small through hole of said rear fork.

* * * * *